(No Model.)
J. T. PEDERSEN.
TOOL HOLDER AND TOOLS FOR THE SAME.
No. 386,262. Patented July 17, 1888.
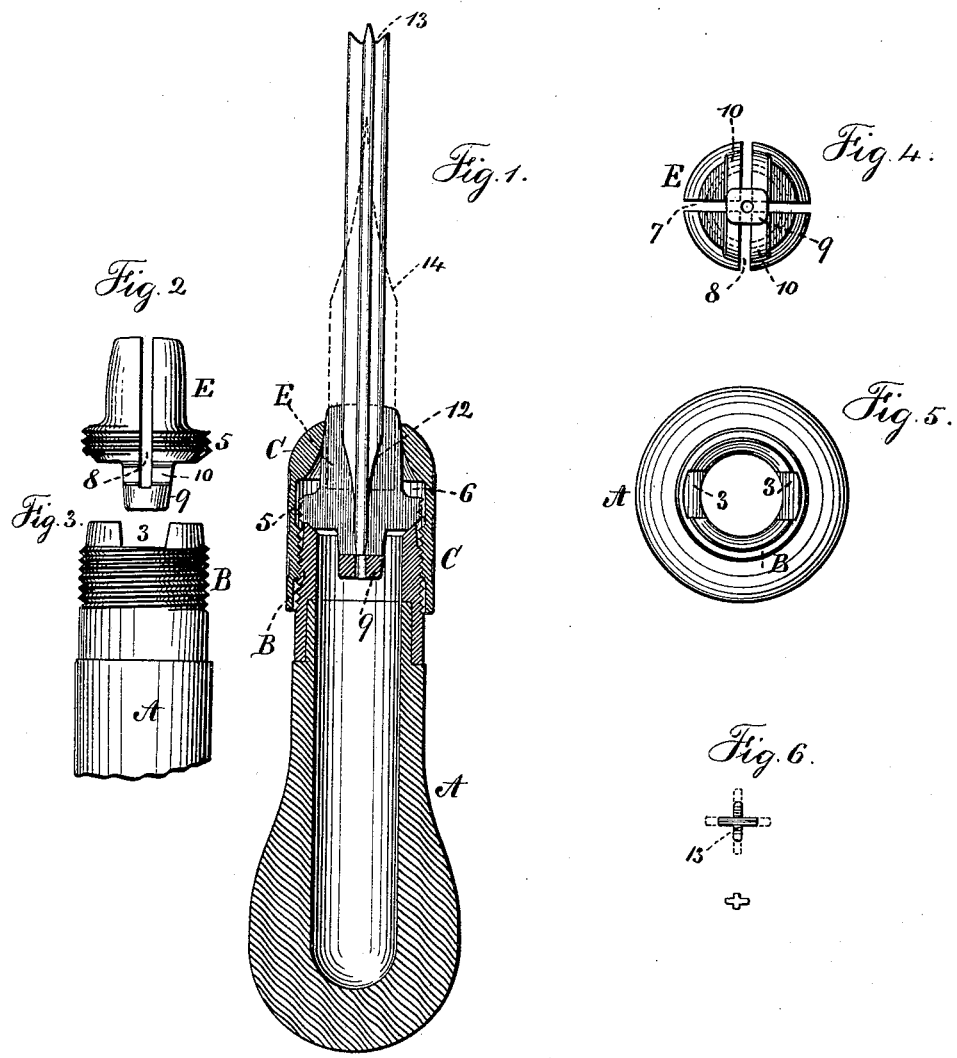
Witnesses:
J. Stail
Chas. H. Smith
Inventor:
Johannes T. Pedersen,
per Lemuel W. Serrell
Atty

United States Patent Office.

JOHANNES TH. PEDERSEN, OF BROOKLYN, NEW YORK.

TOOL-HOLDER AND TOOLS FOR THE SAME.

SPECIFICATION forming part of Letters Patent No. 386,262, dated July 17, 1888.

Application filed August 16, 1887. Serial No. 247,066. (No model.)

*To all whom it may concern:*

Be it known that I, JOHANNES TH. PEDERSEN, of Brooklyn, E. D., in the county of Kings and State of New York, have invented an Improvement in Tool-Holders and Tools for the Same, of which the following is a specification.

Handles for tools have been made hollow for the reception of small tools or bits, and the chuck for the same has been split longitudinally, so as to be closed by the action of a screw and a surrounding conical case.

In my present improvements the chuck is held in its place so that it cannot fall out of the surrounding case when the handle is unscrewed and removed, and the chuck is divided by incisions that cross each other, and these incisions are sufficiently wide to receive within them the tool or base of the tool, which is made as a cross, so that the tool is not held alone by the frictional clamping action on the edges of a round tool or shank; but the cross of the tool enters into the cross of the slots, and hence it cannot turn around in the chuck, but is reliably revolved by the chuck and the handle, that is notched to receive the base of the chuck. By this means there is no tendency to revolve the screw that closes the chuck, and it cannot become loose in consequence of strain applied by the handle to the tool through the chuck.

In the drawings, Figure 1 is a vertical section of the tool-holder and an elevation of the tool. Fig. 2 is a side view of the chuck. Fig. 3 is a side view of the screw upon the handle. Fig. 4 is an inverted plan of the spring-chuck. Fig. 5 is an end view of the handle, and Fig. 6 shows end views of the tools or tool-stock.

The handle A is preferably of wood and hollow, and around the open end thereof is the tubular screw B, the end portion of which is notched at 3, and the screw-thread adjacent to this notch is preferably removed. The tubular case C is adapted to screw upon the outside of the tubular screw B and handle, and the end is provided with a tapering opening for receiving the chuck, and the screw-thread within this case C at the inner end is turned off or recessed, so that the chuck E, which has a screw-thread, 5, around its base, may be screwed into the case C, and as soon as the screwed portion 5 passes into this recessed portion 6 of the case C the chuck may be revolved regardless of the screw upon its edge; but this screw upon its edge prevents the chuck falling out of the case C when the handle A and screw B are removed from the case C to give access to the hollow interior of the handle, into which handle tools or bits can be inserted. In this manner I provide for keeping the case and the chuck in their proper relative positions and allow these two parts to be removed from the hollow handle containing the bits or tools, and the chuck and case when screwed in place close up the end of the hollow handle to retain the bits or tools therein.

The chuck itself is divided into four parts by the cross-slots 7 and 8; but these are connected by the rear or hub portion, 9, and upon the base of the chuck there are the cross projecting portions 10, that pass into and are received by the slots 3 in the tubular screw B; hence the power that is made use of to rotate the screw-driver or other tool is transmitted directly from the handle A and notched tubular screw B to the chuck E and the tool contained therein, and the object of the screw-case C is simply to contract the externally-tapering jaws of the chuck sufficiently to hold the tool in place.

The tool itself, or the base thereof, is made of metal, the cross-section of which is a cross, the arms of the cross being of greater or less length, as illustrated in Fig. 6, which shows two lengths of such arms; but the thicknesses of the arms should be the same, or nearly so, to correspond to the longitudinal incisions 7 and 8 in the chuck, so that the tool will be rotated by the chuck without the possibility of its slipping around therein, and the only object in contracting the chuck upon the tool is to produce sufficient friction to prevent the tool dropping endwise out of the chuck.

By this improvement I am able to grasp by the chuck tools that are large or small, because the lengths of the arms of the cross may vary from a very small size to the largest size that will pass through the opening in the case C, as indicated by dotted lines in Figs. 1 and 6; and a two-ended screw-driver may be made from the sectionally cross-shaped metal by removing two of the sides near the end, as indicated at 12, Fig. 1; or by filing notches at the ends of two arms of the cross, as seen at 13, Fig. 1, and leaving the end of the other two arms projecting, the end of the screw-driver is formed; or the metal at the edges of the cross may be tapering, as seen by the dotted lines 14, Fig. 1, to form a reamer, and in fact any tool adapted to this holder can be made out of steel wire or rods that are sectionally a cross to fit the chuck.

It is to be understood that in all instances the tool is formed of a metal bar that is a cross in its sectional shape throughout its length, the metal being removed more or less at or near one or both ends to form the operative portion of the tool.

When the metal of the screw-driver is a cross in section near the point of such screw-driver, and the points are left at each side of the screw-driver by filing, as at 13, the same steady the screw and keep it in line with the screw-driver while being driven in, and the screw-driver can be filed up very easily.

If the handle A is of metal, the tubular screw B may be in one piece therewith.

I claim as my invention—

1. The combination, with the tubular handle A and tubular screw B thereon and notched at the end, of the chuck E at the end of the screw B and divided longitudinally into four parts by slots that cross each other, and provided with projections at the rear to pass into the notches of the screw, and the tubular case C, surrounding the chuck and the screw B, substantially as set forth.

2. The combination, with the handle A and screw B, of the tubular case C, having an internal screw-thread and recessed at 6, and the chuck E, having a screw-thread around its base, substantially as set forth.

3. The tool and its shank formed of a straight metal bar that is a cross in its sectional shape throughout its length, except at the end, where the metal is removed more or less to form the operative portion of the tool, substantially as set forth.

4. A screw driver formed of metal which is a cross in its sectional shape, with two of the arms of the cross notched at their end, as at 13, at the sides of the screw-driver end, substantially as set forth.

Signed by me this 11th day of August, A. D. 1887.

JOHANNES TH. PEDERSEN.

Witnesses:
  GEO. T. PINCKNEY,
  WILLIAM G. MOTT.